US007907421B2

(12) United States Patent
Chen et al.

(10) Patent No.: US 7,907,421 B2
(45) Date of Patent: Mar. 15, 2011

(54) APPARATUS AND METHODS FOR RETAINING EXPANSION CARDS

(75) Inventors: Yu-Lin Chen, Taipei (TW); Yao-Chien Lien, Taipei (TW); Chien Hung Chou, Xizhi (TW); Chin-An Huang, Xindian (TW)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 12/456,731

(22) Filed: Jun. 22, 2009

(65) Prior Publication Data
US 2010/0321907 A1    Dec. 23, 2010

(51) Int. Cl.
*H05K 7/12* (2006.01)

(52) U.S. Cl. ........ 361/801; 361/759; 361/747; 361/726; 361/732

(58) Field of Classification Search .......... 361/726, 361/732, 740, 747, 759, 801
See application file for complete search history.

(56) References Cited

U.S. PATENT DOCUMENTS

| | | | |
|---|---|---|---|
| 6,173,843 B1 | 1/2001 | Christensen et al. | |
| 6,181,565 B1 | 1/2001 | Schmitt et al. | |
| 6,215,668 B1 | 4/2001 | Hass et al. | |
| 6,220,887 B1 | 4/2001 | Downs | |
| 6,515,867 B2 * | 2/2003 | Sheng-Hsiung et al. | 361/759 |
| 6,618,263 B1 * | 9/2003 | Kin-Wing et al. | 361/759 |
| 6,738,261 B2 | 5/2004 | Vier et al. | |
| 6,920,048 B2 | 7/2005 | Holt et al. | |
| 6,960,720 B2 * | 11/2005 | Wen-Lung | 174/50 |
| 7,050,296 B2 * | 5/2006 | Liao | 361/679.33 |
| 7,126,828 B2 * | 10/2006 | Beall et al. | 361/801 |
| 7,209,365 B2 | 4/2007 | Chang | |
| 2003/0206406 A1 | 11/2003 | Vier et al. | |
| 2007/0030660 A1 * | 2/2007 | Peng et al. | 361/801 |
| 2008/0055871 A1 | 3/2008 | Sanchez et al. | |

OTHER PUBLICATIONS

Line drawings of prior art two-piece plastic card retaining clip that is illustrated and described in relation to Figures 1A-1E of the present application; 3 pgs.

* cited by examiner

*Primary Examiner* — Dameon E Levi
(74) *Attorney, Agent, or Firm* — O'Keefe, Egan, Peterman & Enders LLP (57) ABSTRACT

Apparatus and methods for retention of computer expansion cards and/or card bay covers inside a card bay of an information handling system chassis, and that may include an expansion card retaining apparatus that includes a pivotable first end configured to attachably rotate relative to a securing surface of the information handling system chassis, a latching second end configured to releasably lock the expansion card retaining apparatus in a locking position that prevents rotation of the expansion card retaining apparatus about the pivotable first end, at least one resiliently deformable coupling section extending between the pivotable first end and the latching second end to maintain the latching second end in the locking position, and a retention section extending between the at least one coupling section and the pivotable first end.

25 Claims, 10 Drawing Sheets

APPARATUS AND METHODS FOR RETAINING EXPANSION CARDS

FIELD OF THE INVENTION

This invention relates generally to information handling systems, and more particularly to retention of expansion cards for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer servers, such as 1U chassis rack-mounted or tower servers, commonly employ expansion cards such as Peripheral Component Interface (PCI) cards. Due in part to space and thermal design concerns, PCI cards are typically mounted in a horizontal position at the back of the server. Methods commonly used to attach such cards to the server chassis, include metal brackets made for sheet metal or plastic retainers.

Figure 1A:
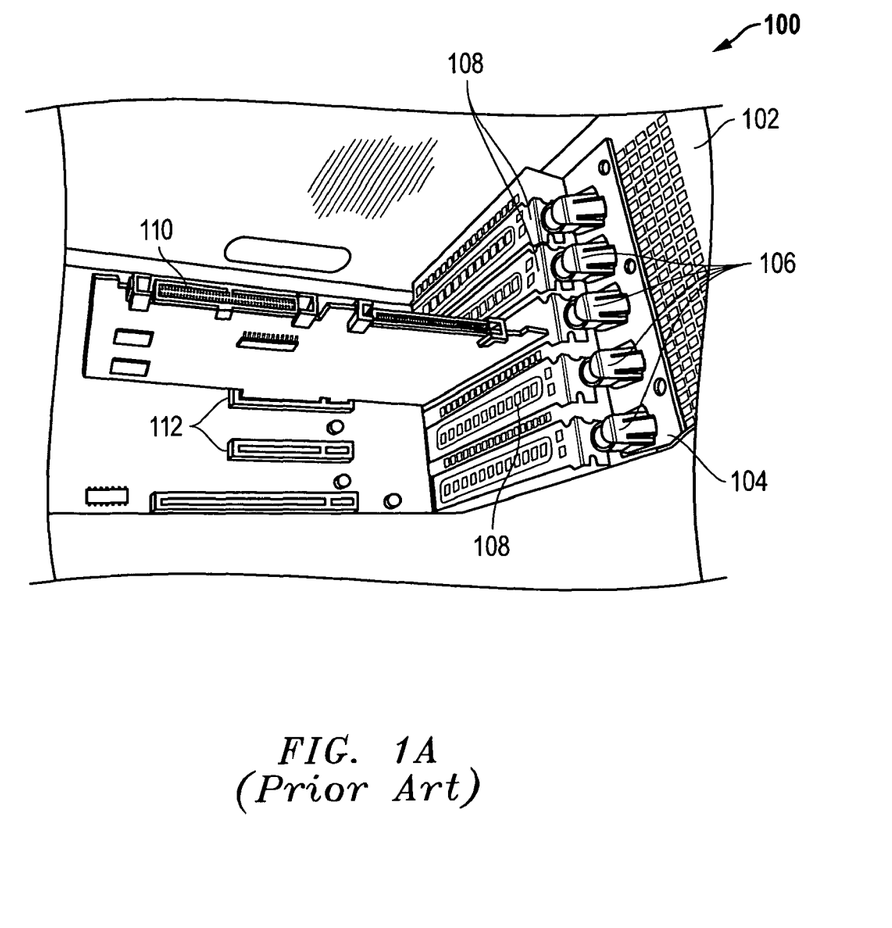
FIGS. 1A-1E are perspective views of a tower server having expansion card retaining clips of the prior art.

FIG. 1A illustrates one example of a PCI card 110 received within an available card bay and positioned in an inserted position within a corresponding PCI connector 112 inside a computer server chassis 102 of a tower server 100 according to methodology of the prior art. As shown in FIG. 1A, a two-piece plastic card retaining clip 106 is provided in the rear sheet metal surface of server chassis 102 to hold and maintain PCI card 110 in its inserted position within the corresponding card bay opening and PCI connector 112. Other two-piece plastic retaining clips 106 are also positioned to retain individual card bay covers 108 in position over corresponding empty card bay openings. Retaining clips 106 are rotatably mounted in adjacent and aligned relationship as shown within corresponding retention clip openings provided in retaining card bay member 104 and the rear sheet metal of chassis 102, with each being positioned over a corresponding card bay opening so as to allow tool-less installation and removal of PCI cards. In this regard, each of retaining clips 106 of FIG. 1A are rotated inward into a locking position over a corresponding retaining bracket of a PCI card 106 or card bay cover 108 to hold and maintain it in place.

Figure 1B:
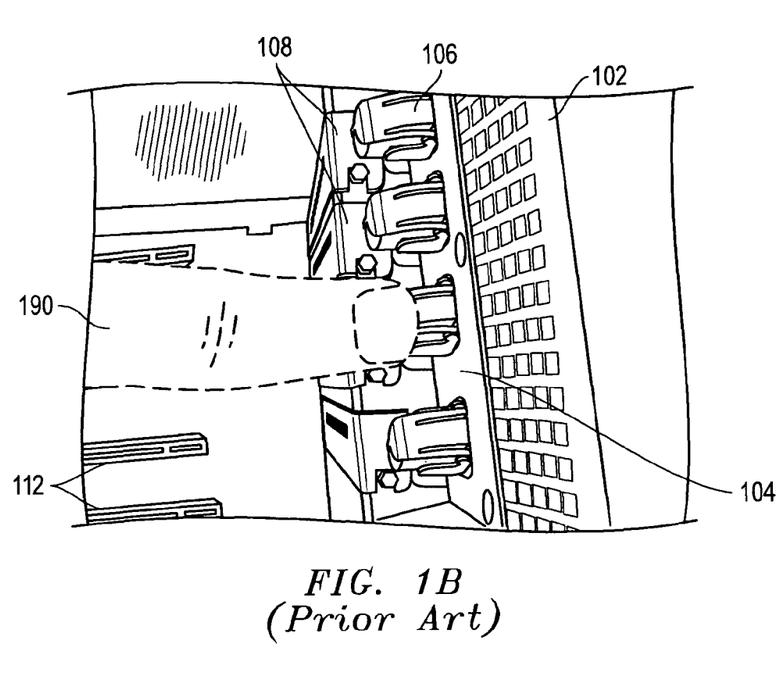
Figure 1C:
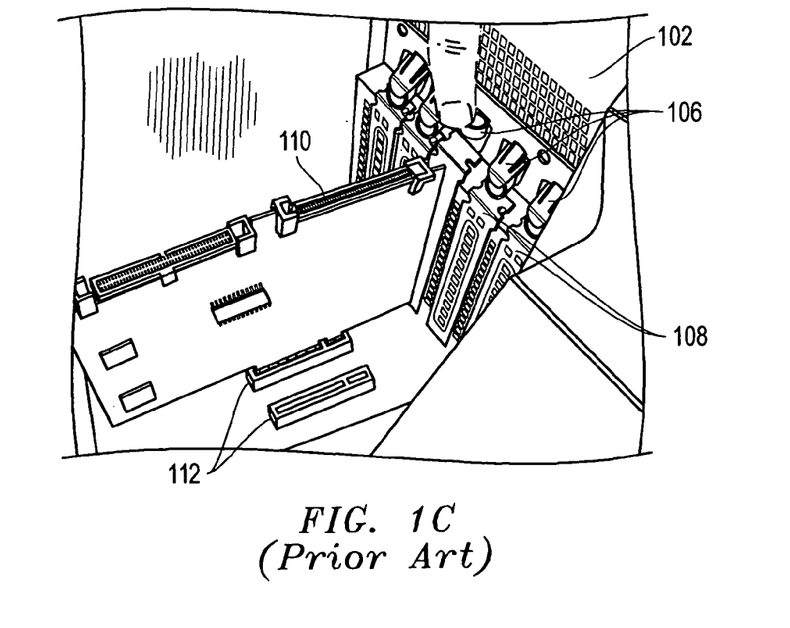

FIG. 1B shows an overhead view of prior art retaining clips 106 in locking position inside chassis 102, with a human hand 190 in position to depress (or press down on) and release one of retaining clips 106 from a locking position over a corresponding retaining bracket of a PCI card 110 in order to allow rotation of the retaining clip 106 outward for removal of the respective PCI card 110 from server chassis 102. FIG. 1C shows a perspective view of the released retaining clip 106 of FIG. 1B after it has been so released and rotated outward for removal of the respective PCI card 110 from server chassis 102.

Figure 1D:
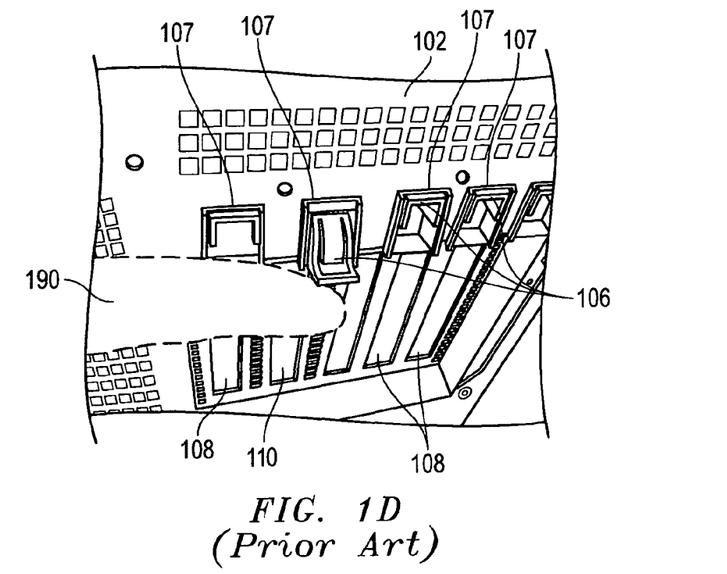
Figure 1E:
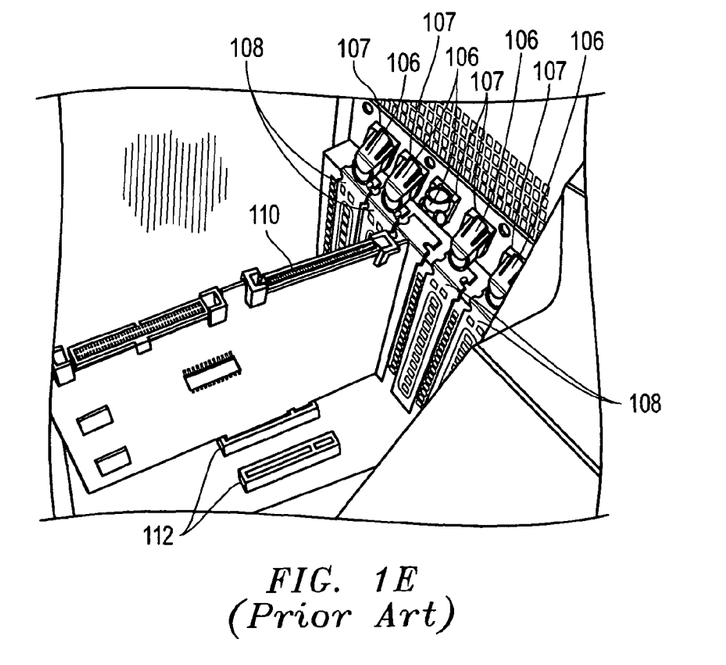

FIG. 1D shows an external view of the rear of chassis 102 with all of prior art two-piece retaining clips 106 rotated inward into chassis 102 into a locking position except for one of two-piece retaining clips 102 which is shown rotated outward into an unlocked or release position in which it extends outward from the rear surface of chassis 102 as shown. In FIG. 1D, human hand 190 is shown in position to rotate the unlocked retaining clip 102 inward, i.e., into a locking position. FIG. 1E shows an internal view of the rear surface of chassis 102 corresponding to FIG. 1D, i.e., with all of prior art two-piece retaining clips 106 rotated inward into chassis 102 into a locking position over a corresponding bracket of a card bay cover 108, except for one of two-piece retaining clips 102 which is shown rotated outward into an unlocked or release position over PCI card 110 in order to provide clearance such that PCI card may be disengaged from a corresponding PCI connector 112 and removed upward and out from server chassis 102, or vice-versa.

SUMMARY OF THE INVENTION

Disclosed herein are apparatus and methods for retention of computer expansion cards (e.g., PCI circuit cards, PCI-express (PCI-E) circuit cards, industry standard architecture (ISA) circuit cards, accelerated graphics port (AGP) circuit cards, vesa local bus (VLB) circuit cards, etc.) inside an information handling system chassis (e.g., such as 1U rack mounted chassis, 2U rack mounted chassis, etc.). Advantageously, the disclosed expansion card apparatus and methods may be implemented in a tool-less manner in one embodiment at a relatively lower cost than conventional tool-less plastic expansion card retention clips.

In one respect, disclosed herein is a method of retaining an expansion card assembly or card bay cover in a card bay of an information handling system, the method including: providing an expansion card retaining apparatus that includes a pivotable first end, the pivotable first end being rotatably attached to a securing surface of the information handling system chassis; a latching second end, the latching second end being configured to be at least partially received in a chassis opening defined in a card bay assembly surface of the information handling system chassis that has a frontside and backside; at least one resiliently deformable coupling section extending between the pivotable first end and the latching second end; and a retention section extending between the at least one coupling section and the pivotable first end. The method may also include positioning the retention section to bias a retaining bracket of the card assembly or card bay cover against a securing surface of the information handling system chassis while at the same time the latching second end is in a locking position within the chassis opening to retain the expansion card assembly or card bay cover in installed position within the card bay, and releasably locking the expansion card retaining apparatus within the chassis opening defined in the card bay assembly surface of the information handling system chassis in the locking position to prevent rotation of the expansion card retaining apparatus about the pivotable first end by positioning the latching second end within the chassis opening to maintain the latching second end in the locking position with the bias applied to the retaining bracket of the card assembly or card bay cover.

In another respect, disclosed herein is an information handling system, including a chassis having a card bay configured to receive expansion cards, the card bay including a securing surface and a card bay assembly surface having a frontside and a backside, and at least one opening defined in the card bay assembly surface. The information handing system may also include an expansion card retaining apparatus that includes: a pivotable first end, the pivotable first end being rotatably attached to the securing surface of the information handling system chassis; a latching second end, the latching second end being configured to be at least partially received in the chassis opening defined in the card bay assembly surface of the information handling system chassis; at least one resiliently deformable coupling section extending between the pivotable first end and the latching second end, and a retention section extending between the at least one coupling section and the pivotable first end. The retention section may be configured to bias a retaining bracket of a card assembly or card bay cover against a securing surface of the information handling system chassis when the latching second end is in the locking position within the chassis opening to retain the expansion card assembly or card bay cover in installed position within the card bay. The retention section may also be configured to rotate away from the securing surface of the information handling system chassis when the latching second end is released from the locking position so that the retaining bracket of the expansion card assembly or card bay cover is removable from the card bay.

In another respect, disclosed herein is an expansion card retaining apparatus for retaining an expansion card assembly and card bay cover in a card bay of an information handling system, the expansion card retaining apparatus including: a pivotable first end, the pivotable first end being configured to attachably rotate relative to a securing surface of the information handling system chassis; a latching second end, the latching second end being configured to releasably lock the expansion card retaining apparatus within a chassis opening defined in a card bay assembly surface of the information handling system chassis in a locking position that prevents rotation of the expansion card retaining apparatus about the pivotable first end; at least one resiliently deformable coupling section extending between the pivotable first end and the latching second end, the coupling section being resiliently deformable and the latching second end being positionable within the chassis opening to maintain the latching second end in the locking position, the coupling section being further resiliently deformable by an external force to remove the bias from the latching second end within the chassis opening and release the latching second end from the locking position; and a retention section extending between the at least one coupling section and the pivotable first end. The retention section may be configured to bias a retaining bracket of a card assembly or card bay cover against a securing surface of the information handling system chassis when the latching second end is in the locking position within the chassis opening to retain the expansion card assembly or card bay cover in installed position within the card bay. The retention section may also be configured to rotate away from the securing surface of the information handling system chassis when the latching second end is released from the locking position so that the retaining bracket of the expansion card assembly or card bay cover is removable from the card bay.

DESCRIPTION OF ILLUSTRATIVE EMBODIMENTS

Figure 2:
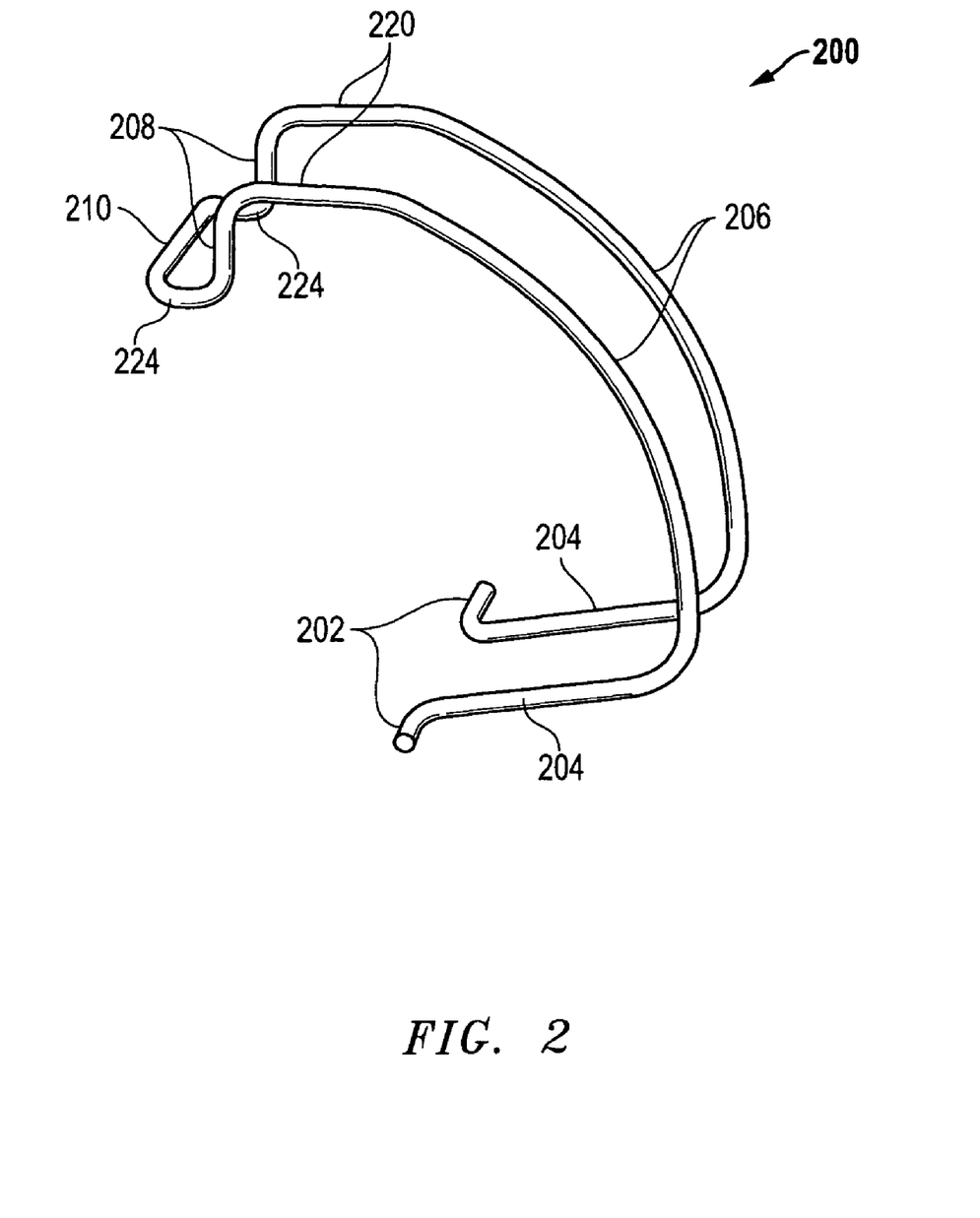
FIG. 2 is a side perspective view of an expansion card retaining apparatus according to one embodiment of the disclosed apparatus and methods.

FIG. 2 is a side perspective view of an expansion card retaining apparatus 200 according to one embodiment of the disclosed apparatus and methods. As shown, expansion card retaining apparatus 200 of this embodiment is of single-piece elongated construction being manufactured, for example, from a single piece of elongated wire that has been bent or otherwise formed into the shape shown. In one exemplary embodiment, expansion card retaining apparatus 200 may be formed from a resilient metal wire (i.e., steel, aluminum, etc.), although other resilient materials such as suitably resilient plastic may be employed. Such a resilient material may be resiliently deformed, meaning that after deformation from an original shape or position to a new shape or position the resilient material returns to its original shape or position as long as the deformation does not exceed the elastic limit of the material. Further, it is also possible that an expansion card retaining apparatus 200 may be formed to have similar shape and characteristics from multiple pieces and/or from elongated materials other than cylindrical wire. In one particular example, expansion card retaining apparatus 200 may be formed from a single piece of elongated metal wire having a diameter of about 1.2 mm (0.047 inches).

In the exemplary embodiment of FIG. 2, expansion card retaining apparatus 200 is provided with a first pivotable end that includes two outwardly and oppositely facing pivot axles 202 that are formed from the respective ends of a single piece of elongated material such as metal wire. Expansion card retaining apparatus 200 is provided with a second and opposite latching end having a transverse linking segment 210 that serves to link together two adjacently-spaced clip segments which each terminate with one of the corresponding pivot axles 202 in the manner shown. Each of the adjacent clip segments includes a coupling section that in this embodiment itself includes a respective arcuate section 206 and a respective flattened section 220. The latching end of expansion card retaining apparatus 200 also includes a downward-stepping latch section 208 that is provided between each of the coupling sections and a respective step section 224 of the latching section, which in turn terminates at a transverse linking segment 210 that couples the two clip segments together. A respective card assembly retention section 204 is provided as shown between each coupling section and a corresponding one of pivot axles 202 of expansion card retaining apparatus 200.

Figure 3:
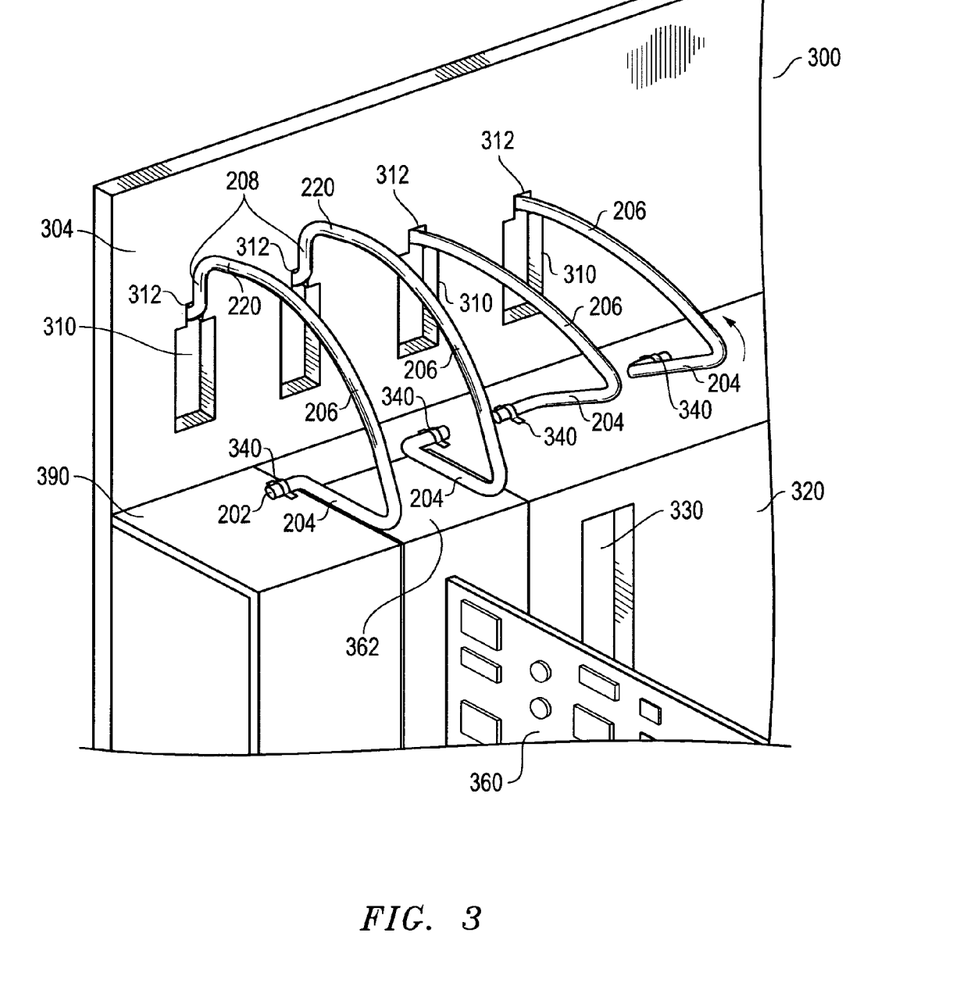
FIG. 3 is a partial perspective view of an information handling system chassis according to one exemplary embodiment of the discloses apparatus and methods.
Figure 4:
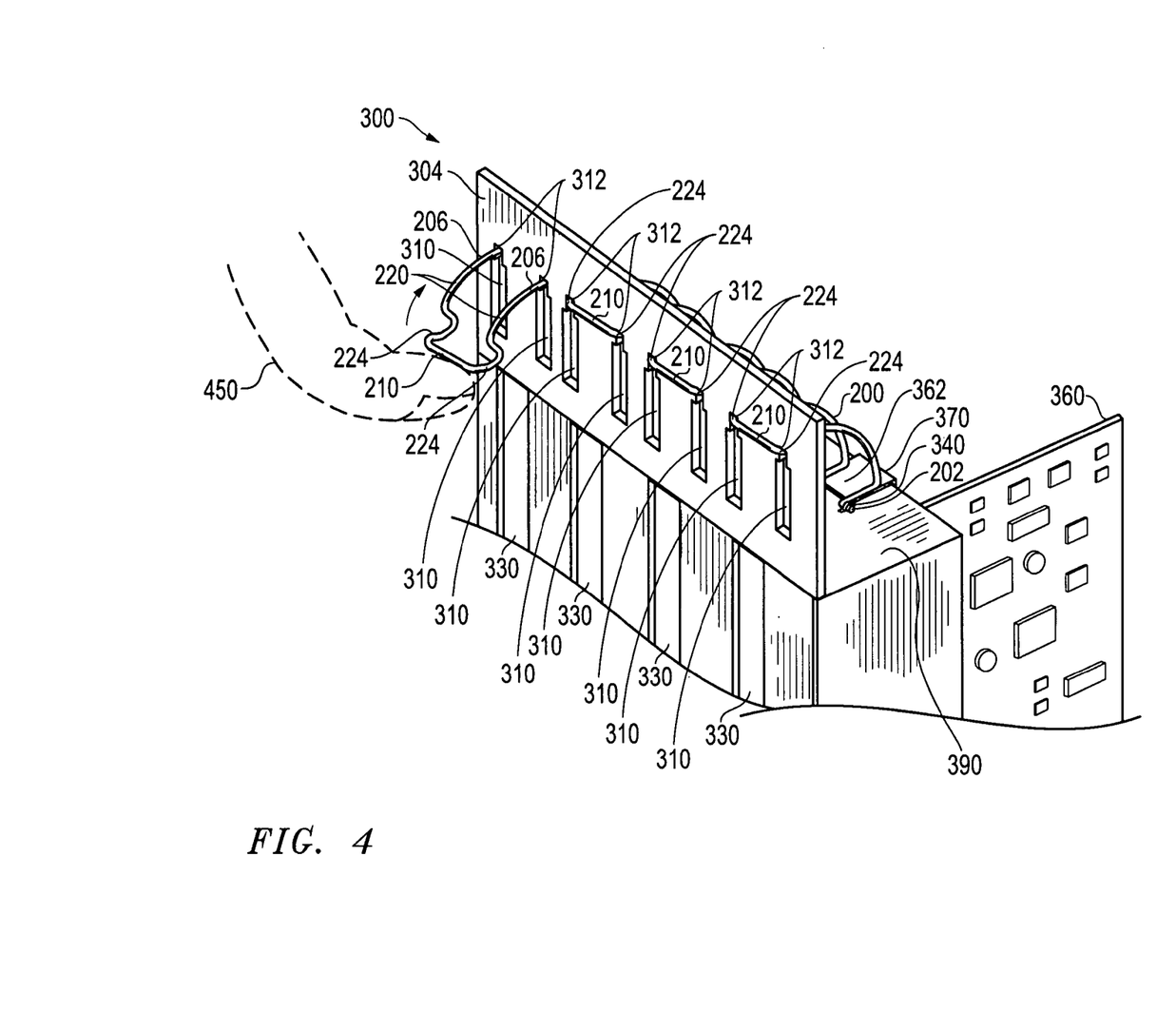
FIG. 4 is a partial perspective view of an information handling system chassis according to one exemplary embodiment of the discloses apparatus and methods.
Figure 5:
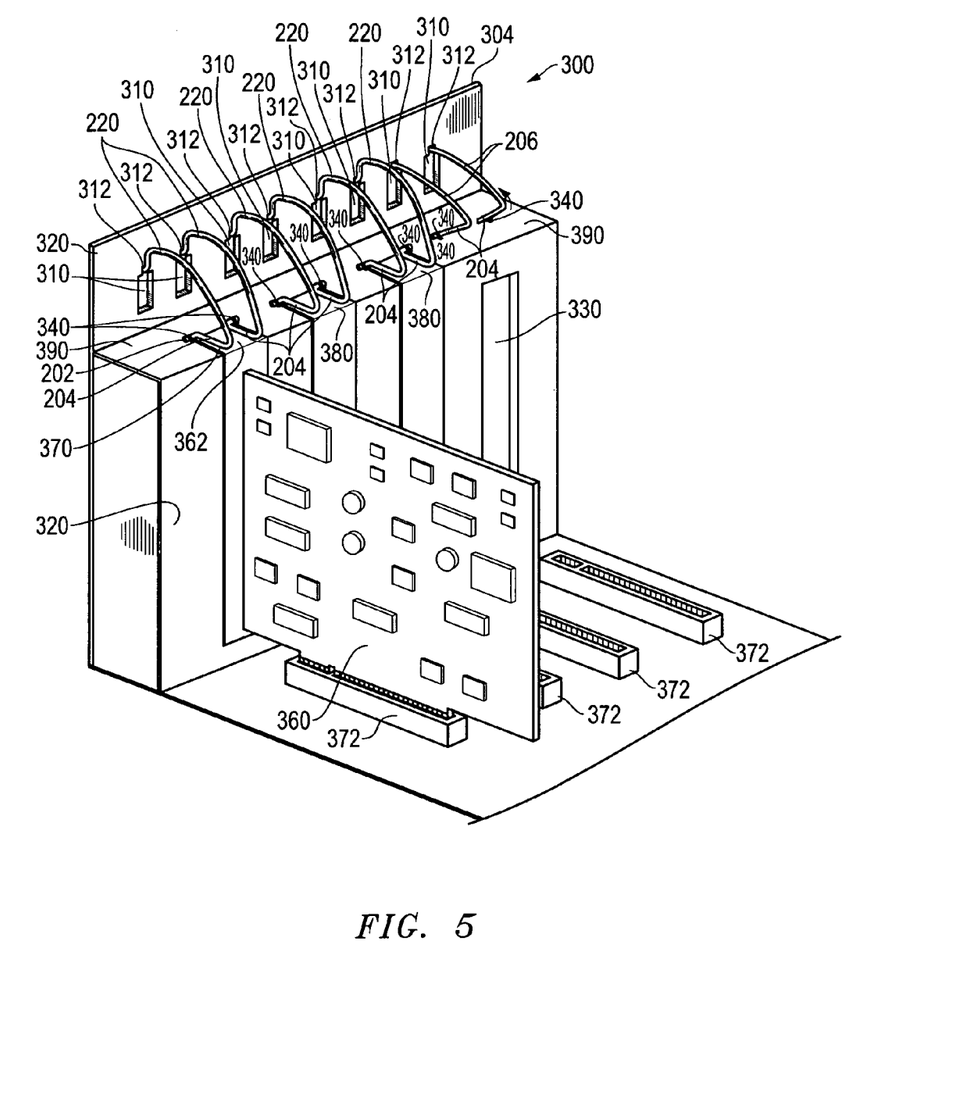
FIG. 5 is a partial perspective view of an information handling system chassis according to one exemplary embodiment of the discloses apparatus and methods.

FIGS. 3-5 show one exemplary embodiment of an information handling system chassis 300 that includes a card bay assembly rear surface 304, e.g., such as sheet metal rear surface of an information handling system chassis (e.g., inside a chassis of a tower computer server or desktop computer). In this regard, FIGS. 3 and 5 are each a frontside view of card bay assembly rear surface 304 from the inside of information handling system chassis 300, and FIG. 4 is a backside view of card bay assembly rear surface 304 from the outside of information handling system chassis 300. As shown, a PCI card assembly 360 having a printed circuit board attached to a retaining bracket 362 is received and locked in position within an available card bay adjacent a corresponding card bay opening 330 that is hidden from view in FIGS. 3 and 5, but visible from the backside in FIG. 4. In this position, connector/s of PCI card assembly 360 are simultaneously received and locked into an inserted position within a corresponding PCI connector/s 372 of the information handling system as shown. FIGS. 4 and 5 illustrate card bay covers 380 that may be alternatively locked into positioned over an empty card bay opening 330 by an expansion card retaining apparatus 200 of the present disclosure. Available and empty card bay openings 330 are also shown in FIGS. 3-5.

Still referring to FIGS. 3-5, each individual multiple single piece card retaining apparatus 200 is rotatably coupled to an inwardly protruding securing surface 390 of server chassis 102 using two pivot axles 202 which are each themselves rotatably received in an opening formed by a respective axle retaining structure 340 that is formed or otherwise provided on inwardly protruding securing surface 390 of chassis 340. Each individual card retaining apparatus 200 is also received as shown in a pair of elongated chassis openings 310 which are defined in card bay assembly rear surface 304. In this regard, each pair of elongated chassis openings 310 includes two adjacent elongated chassis openings 310 that are spaced apart from each other by a distance that corresponds to the spacing between adjacently-spaced clip segments of a given retaining apparatus 200 such that the clip segments are movable within the elongated chassis openings 310 to allow the given retaining apparatus 200 to rotate about the axle retaining structures 340 as shown by the arrows in FIGS. 3-5.

As shown, each elongated chassis opening 310 defined in card bay assembly rear surface 304 is also provided with a corresponding optional narrowed section 312 that is dimensioned to receive a step section 224 of a card retaining apparatus 200 in locking position as shown in FIGS. 3-5. When in locking position, card assembly retention sections 204 of a card retaining apparatus 200 are configured to contact and downwardly bias a respective retaining bracket 362 of a PCI card assembly 360 against inwardly protruding securing surface 390 of server chassis 102 in a manner that acts to retain connector/s of PCI card assembly 360 in an inserted position within a corresponding PCI connector/s of the information handling system.

At the same time, each clip segment of expansion card retaining apparatus 200 is held in place within a corresponding optional narrowed section 312 (i.e., so that it does not rotate within axle retaining structures 340) by virtue of contact of latch section 208 with the frontside of card bay assembly rear wall 304 and contact of retention sections 204 with retaining bracket 362 such that step section 224 is retained within a corresponding elongated chassis opening 310 as shown. When present, contact of optional transverse linking segment 210 with the backside surface of card bay assembly rear wall 304 also may act to hold each clip segment of expansion card retaining apparatus 200 in place. At the same time, each step section 224 is upwardly biased toward the upper inside surface of narrowed section 312 of a corresponding elongated chassis opening 310 by virtue of compression of the clip segments of card retaining apparatus 200 which are dimensioned such that they must be bent downward to allow flattened sections 220 to pass through corresponding narrowed sections 312 of a elongated chassis opening 310 when pivot axles 202 are received in respective axle retaining structures 340. However, in other embodiments it is not necessary that step sections 224 contact the upper inside surface of narrowed section 312 in order for card retaining apparatus 200 to be maintained in locking position, as long as latch section 208 is held in position adjacent frontside of card bay assembly rear wall 304 such that each clip segment of expansion card retaining apparatus 200 cannot rotate within axle retaining structures 340 to unlocked position due to contact of latch section 208 with retaining bracket 362.

Still referring to FIGS. 3-5, each pair of elongated chassis openings 310 defined in card bay assembly rear wall 304 are configured with suitable individual opening widths and suitable spacing between openings to allow insertion of outwardly and oppositely facing pivot axles 202 of an individual expansion card retaining apparatus 200 through card bay assembly rear wall 304 from the backside of rear wall 304 such that pivot axles 202 may be inserted into respective axle retaining structures 340, e.g., by inwardly deforming (squeezing or compressing) together the adjacently-spaced clip segments of the expansion card retaining apparatus 200 such that each pivot axle 202 may be inserted into a respective axle retaining structure 340 and then allowing the resiliently-deformed and adjacently-spaced clip segments of the expansion card retaining apparatus 200 to expand outwardly to their original position with the pivot axles 202 once inserted into the axle retaining structures 340 as shown in FIGS. 3-5.

Figure 6:
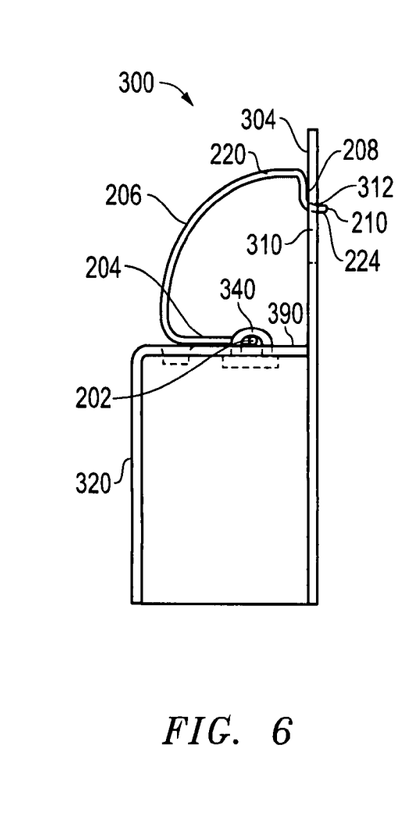
FIG. 6 is a partial side cross-sectional view of an information handling system chassis according to one exemplary embodiment of the discloses apparatus and methods.
Figure 7:
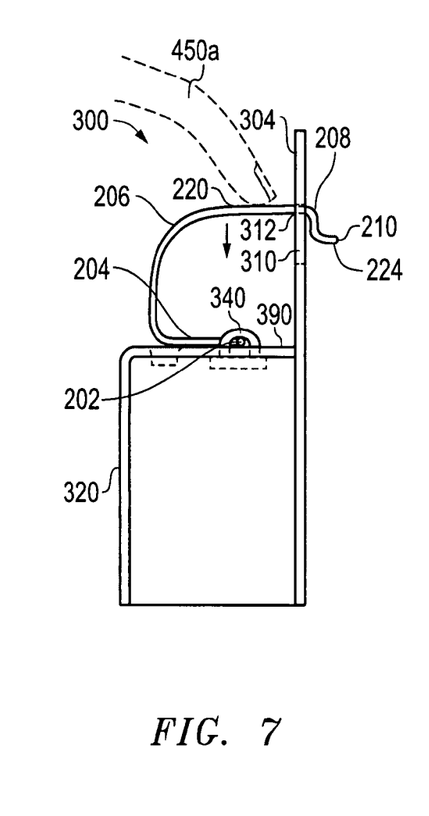
FIG. 7 is a partial side cross-sectional view of an information handling system chassis according to one exemplary embodiment of the discloses apparatus and methods.
Figure 8:
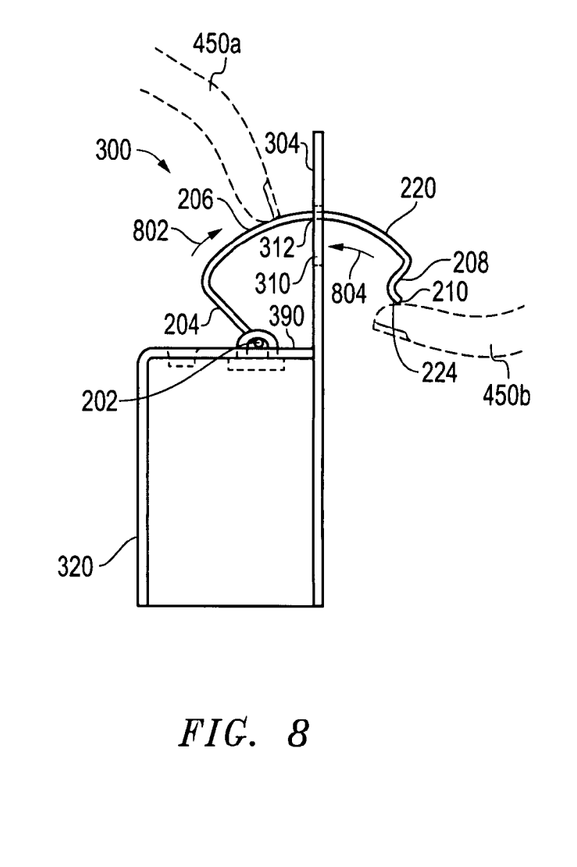
FIG. 8 is a partial side cross-sectional view of an information handling system chassis according to one exemplary embodiment of the discloses apparatus and methods.

FIGS. 6-8 are side cross sectional views that illustrate the process by which an expansion card retaining apparatus 200 may be unlocked and moved to open position in a tool-less manner, i.e., for insertion or removal of a PCI card assembly retaining bracket 362. FIG. 6 shows expansion card retaining apparatus 200 in locking position relative to securing surface 390 and card bay assembly rear wall 304. In the locking position of FIG. 6, step section 224 is received within narrowed section 312 of a corresponding elongated chassis opening 310 and held there by virtue of contact of latch section 208 with the frontside of card bay assembly rear wall 304 and contact of transverse linking segment 210 with the backside surface of card bay assembly rear wall 304. When in this locked position, card assembly retention section 204 is biased downward as shown against securing surface 390 of server chassis 102 (or against a PCI card assembly retaining bracket 362 when it is positioned between retention section 204 and securing surface 390).

FIG. 7 shows downward compression of clip segments of expansion card retaining apparatus 200 by an external force applied in the direction of the arrow from a position inside the server chassis 102 (in this case by a human finger 450a), in order to move expansion card retaining apparatus 200 from locked to unlocking position. Security is provided in this embodiment since force is applied from the inside of server chassis 102 to unlock expansion card retaining apparatus 200. As shown in FIG. 7, clip segments of expansion card retaining apparatus 200 are bent or compressed downward a sufficient distance by one or more fingers 450a to allow clearance for flattened section 220 to pass through elongated channel 310 and allow rotation of expansion card retaining apparatus 200 by finger 450 in the direction of the arrow 802 into unlocking position as shown in FIG. 8 in order to provide clearance such that PCI card assembly 360 may be disengaged from a corresponding PCI connector and removed upward and out from the card bay of the information handling system 300, or vice-versa. When expansion card retaining apparatus 200 is so rotated as shown in FIG. 8, clearance is created as shown between card assembly retention section 204 and securing surface 390 to allow insertion or removal of a PCI card assembly retaining bracket 362 along with its attached PCI card. Expansion card retaining apparatus 200 may be moved back to locking position by reversal of the sequence illustrated in FIGS. 6-8, e.g., by application of an external force (e.g., by a human finger 450b) to transverse linking segment 210 from a position outside the server chassis 102 to rotate expansion card retaining apparatus 200 back into locking position in the direction of arrow 804. Further, it will be understood that card bay covers 380 may be installed and removed by following a similar procedure, i.e., to lock retaining brackets of the card bay covers 380 to securing surface 390 of server chassis 102.

Although the disclosed apparatus and methods have been described and illustrated in relation to PCI card assemblies, it will be understood that the disclosed apparatus and methods may be similarly implemented for retention of other types of computer expansion cards (e.g., PCI circuit cards, PCI-express (PCI-E) circuit cards, industry standard architecture (ISA) circuit cards, accelerated graphics port (AGP) circuit cards, vesa local bus (VLB) circuit cards, etc.) within a card bay of a computer chassis (e.g., such as 1U rack mounted chassis, 2U rack mounted chassis, etc.).

Figure 9:
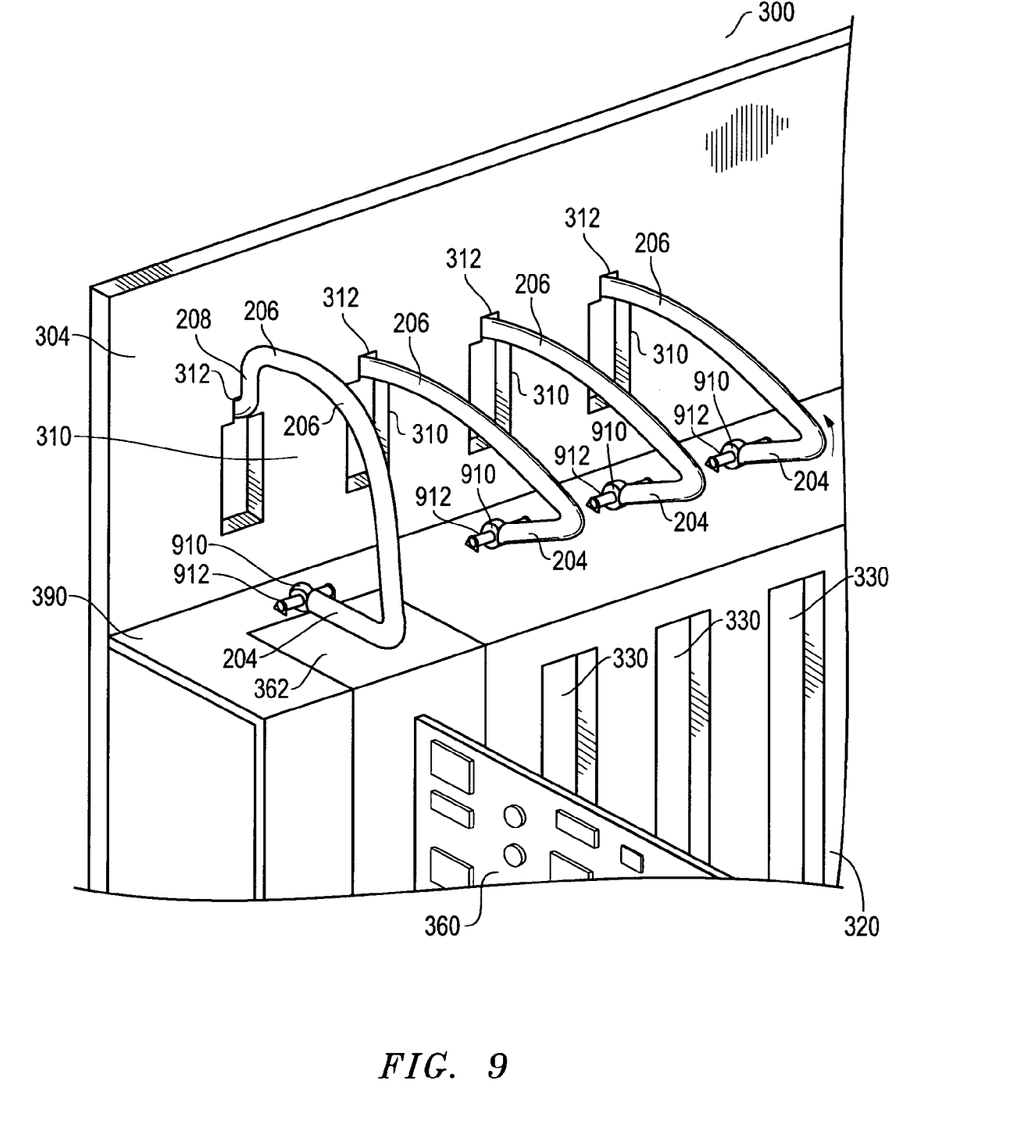
FIG. 9 is a partial perspective view of an information handling system chassis according to one exemplary embodiment of the discloses apparatus and methods.
Figure 10:
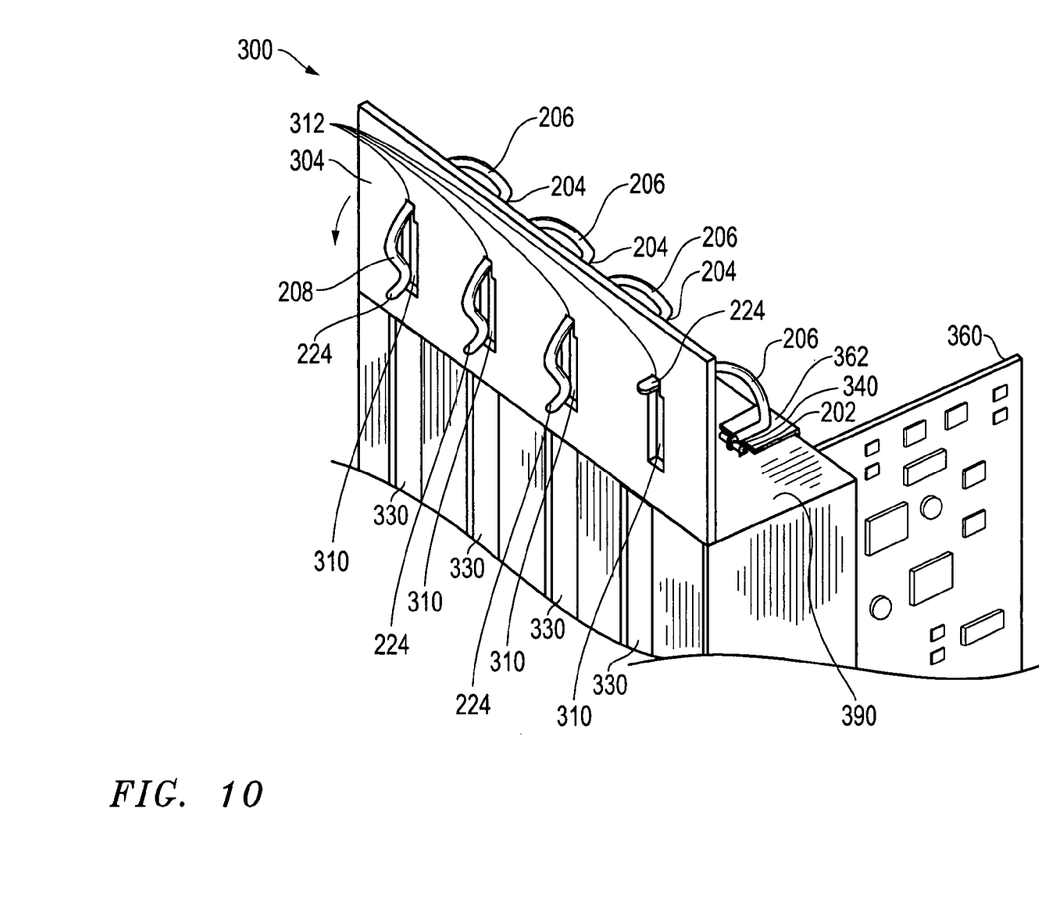
FIG. 10 is a partial perspective view of an information handling system chassis according to one exemplary embodiment of the discloses apparatus and methods.

It will further be understood that the particular embodiment of expansion card retaining apparatus illustrated in FIGS. 2-8 is exemplary only and that other configurations are possible. For example, outwardly facing pivot axles 202 may be replaced by any other mechanical pivot feature or assembly, e.g., an expansion card retaining apparatus 200 may have clip segments that are alternatively configured at one end with openings 910 that are configured to receive a pivot axle 912 inserted therethrough that rotatably secure the retention clip 200 to the computer chassis as shown for the exemplary embodiment of FIGS. 9-10. Further, it will be understood that flattened section 220 is optional and that an arcuate section 206 may extend between sections 204 and 208 without a flattened section 220 as shown in the embodiment of FIGS. 9-10. Moreover, an expansion card retaining apparatus 200 may be configured in other embodiments with a single clip segment as shown in FIGS. 8-9, or with more than two clip segments, e.g., that are linked together by a transverse linking segment 210 in the same manners as the two clip segments of the embodiment of FIGS. 2-8. In a single clip segment embodiment such as shown in FIGS. 8-9, no transverse linking section is present, and the clip segment of expansion card retaining apparatus 200 is held in place within opening 310 by virtue of contact of latch section 208 with the frontside of card bay assembly rear wall 304 and contact of retention section 204 with retaining bracket 362 such that step section 224 is retained within chassis opening 310 as shown.

It will also be understood that the arcuate shape of section 206 may be replaced with a linear shape or any other combination of shapes or configurations for forming at least a portion of a clip segment that is resiliently deformable so as to bias a retention section 204 of a card retaining apparatus 200 against a retaining bracket 362 of a PCI card assembly 360 or card bay cover 380, while at the same time biasing a step section 224 against the inside surface of a corresponding elongated chassis opening 310 with latch section 208 positioned adjacent the frontside of card bay assembly rear wall 304 and a transverse linking segment 210 positioned adjacent the backside surface of card bay assembly rear wall 304 so that expansion card retaining apparatus 200 is held in place within the elongated chassis opening 310 (i.e., so that it does not rotate relative to the chassis).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of retaining an expansion card assembly or card bay cover in a card bay of an information handling system, the method comprising:
    providing an expansion card retaining apparatus that includes:
        a pivotable first end, the pivotable first end being rotatably attached to a securing surface of the information handling system chassis,
        a latching second end, the latching second end being configured to be at least partially received in a chassis opening defined in a card bay assembly surface of the information handling system chassis that has a frontside and backside,
        at least one resiliently deformable coupling section extending between the pivotable first end and the latching second end, and
        a retention section extending between the at least one coupling section and the pivotable first end;
    positioning the retention section to bias a retaining bracket of the card assembly or card bay cover against a securing surface of the information handling system chassis while at the same time the latching second end is in a locking position within the chassis opening to retain the expansion card assembly or card bay cover in installed position within the card bay; and releasably locking the expansion card retaining apparatus within the chassis opening defined in the card bay assembly surface of the information handling system chassis in the locking position to prevent rotation of the expansion card retaining apparatus about the pivotable first end by positioning the latching second end within the chassis opening to maintain the latching second end in the locking position with the bias applied to the retaining bracket of the card assembly or card bay cover;

wherein the expansion card retaining apparatus includes two resiliently deformable coupling sections extending between the pivotable first end and the latching second end; wherein each of the two resiliently deformable coupling sections forms a part of a respective clip segment, the two respective clip segments being adjacently spaced apart from each other; and wherein the latching second end comprises a transverse linking segment that links together the two adjacently-spaced clip segments.

2. The method of claim 1, further comprising applying an external force to resiliently deform the coupling sections to release the bias from the latching second end within the chassis opening and release the latching second end from the locking position; rotating the retention section away from the securing surface of the information handling system chassis; and removing the retaining bracket and corresponding expansion card assembly or card bay cover from the card bay.

3. The method of claim 1, wherein the pivotable first end comprises a pivot axle extending outwardly from each of the two resiliently deformable clip segments such that a first pivot axle extends from a first one of the clip segments in a direction opposite from the direction that a second pivot axle extends from a second one of the clip segments; and wherein the method further comprises:

inserting the pivotable first end of each of the two respective clip segments simultaneously through respective chassis openings defined in the card bay assembly surface of the information handling system in a direction from the backside to the frontside of the card bay assembly surface;

resiliently-deforming the adjacently-spaced clip segments toward each other and inserting each of the first and second pivot axles into a respective axle retaining structure of the chassis securing surface at the same time;

then allowing the resiliently-deformed and adjacently-spaced clip segments of the expansion card retaining apparatus to expand outwardly to return to their original position with the pivot axles inserted into the axle retaining structures of the chassis securing surface to rotatably attach the pivotable first end of the expansion card retaining apparatus to the securing surface of the information handling system chassis such that the transverse linking segment is positioned on the backside of the card bay assembly surface and the pivotable first end of each of the two respective clip segments is positioned on the frontside of the card bay assembly surface.

4. The method of claim 1, wherein the latching second end comprises a downward-stepping latch section and a step section, the latch section being positioned between the step section and the coupling sections; wherein the method further comprises:

resiliently deforming the coupling sections and rotating the retention section toward the securing surface of the information handling system chassis to move the latching second end toward the card bay assembly surface of the information handling system chassis; and allowing each of the coupling sections to return toward its original shape to hold the latching second end in locking position with the latch section in place opposite the frontside of the card bay assembly surface of the information handling system chassis and the step section positioned within the opening in the card bay assembly surface such that the retention section is maintained in position to bias the retaining bracket of the expansion card assembly or card bay cover against the securing surface of the information handling system chassis.

5. The method of claim 4, further comprising:

resiliently deforming the coupling sections to move the latch section away from position opposite the frontside of the card bay assembly surface of the information handling system chassis to release the latching second end from locking position;

then rotating the retention section away from the securing surface of the information handling system chassis to move the latching second end away from the card bay assembly surface of the information handling system chassis; and then removing the retaining bracket and corresponding expansion card assembly or card bay cover from the card bay.

6. An information handling system, comprising:

a chassis having a card bay configured to receive expansion cards, the card bay including a securing surface and a card bay assembly surface having a frontside and a backside, and at least one opening defined in the card bay assembly surface;

an expansion card retaining apparatus that includes:
a pivotable first end, the pivotable first end being rotatably attached to the securing surface of the information handling system chassis,
a latching second end, the latching second end being configured to be at least partially received in the chassis opening defined in the card bay assembly surface of the information handling system chassis,
at least one resiliently deformable coupling section extending between the pivotable first end and the latching second end, and
a retention section extending between the at least one coupling section and the pivotable first end;

wherein the retention section is configured to bias a retaining bracket of a card assembly or card bay cover against a securing surface of the information handling system chassis when the latching second end is in the locking position within the chassis opening to retain the expansion card assembly or card bay cover in installed position within the card bay; and wherein the retention section is configured to rotate away from the securing surface of the information handling system chassis when the latching second end is released from the locking position so that the retaining bracket of the expansion card assembly or card bay cover is removable from the card bay;

wherein the expansion card retaining apparatus further includes:
two resiliently deformable coupling sections extending between the pivotable first end and the latching second end; wherein each of the two resiliently deformable coupling sections forms a part of a respective clip segment, the two respective clip segments being adjacently spaced apart from each other, each of the two respective clip segments being simultaneously received through respective chassis openings defined in the card bay assembly surface of the information handling system, and a transverse linking segment on the latching second end that links together the two adjacently-spaced clip segments;

wherein the securing surface of the information handling system chassis includes at least two adjacently spaced axle retaining structures;

wherein the pivotable first end of the expansion card retaining apparatus comprises a pivot axle extending outwardly from each of the two resiliently deformable coupling sections such that a first pivot axle extends from a first one of the clip segments in a direction opposite from the direction that a second pivot axle extends from a second one of the clip segments, each of the first and second pivot axles being rotatably received within a respective axle retaining structure provided on the securing surface of the information handling system chassis; and wherein the transverse linking segment is positioned on the backside of the card bay assembly surface and the pivotable first end of each of the two respective clip segments is positioned on the frontside of the card bay assembly surface.

7. The system of claim 6, further comprising at least one expansion card or card bay cover received in the card bay, the expansion card or card bay cover having a retaining bracket;

wherein the retention section is positioned to bias the retaining bracket of the card assembly or card bay cover against the securing surface of the information handling system chassis with the latching second end in a locking position within the chassis opening to retain the expansion card assembly or card bay cover in installed position within the card bay; and wherein the expansion card retaining apparatus is releasably locked within the chassis opening defined in the card bay assembly surface of the information handling system chassis in the locking position to prevent rotation of the expansion card retaining apparatus about the pivotable first end by positioning the latching second end within the chassis opening to maintain the latching second end in the locking position with the bias applied to the retaining bracket of the card assembly or card bay cover.

8. The system of claim 6, wherein the adjacently-spaced clip segments of the expansion card retaining apparatus are configured to resiliently-deform toward each other to allow insertion of each of the first and second pivot axles into a respective axle retaining structure of the chassis securing surface at the same time, and to expand outwardly to return to their original position with the pivot axles inserted into the axle retaining structures of the chassis securing surface to rotatably attach the pivotable first end of the expansion card retaining apparatus to the securing surface of the information handling system chassis such that the transverse linking segment is positioned on the backside of the card bay assembly surface and the pivotable first end of each of the two respective clip segments is positioned on the frontside of the card bay assembly surface.

9. The system of claim 6, wherein the latching second end of the expansion card retaining apparatus comprises a downward-stepping latch section and a step section, the latch section being positioned between the step section and the coupling sections; and wherein:

the coupling sections are configured to resiliently deform to allow the retention section to rotate toward the securing surface of the information handling system chassis to move the latching second end toward the card bay assembly surface of the information handling system chassis; and each of the coupling sections is further configured to return toward its original shape to hold the latching second end in locking position with the latch section in place opposite the frontside of the card bay assembly surface of the information handling system chassis and the step section positioned within the opening in the card bay assembly surface such that the retention section is maintained in position to bias the retaining bracket of the expansion card assembly or card bay cover against the securing surface of the information handling system chassis.

10. The system of claim 9, wherein the coupling sections are configured to resiliently deform to allow the latch section to move away from position opposite the frontside of the card bay assembly surface of the information handling system chassis to release the latching second end from locking position and allow the retention section to rotate away from the securing surface of the information handling system chassis to move the latching second end away from the card bay assembly surface of the information handling system chassis such that the retaining bracket and corresponding expansion card assembly or card bay cover is removable from the card bay.

11. An expansion card retaining apparatus for retaining an expansion card assembly and card bay cover in a card bay of an information handling system, the expansion card retaining apparatus comprising:

a pivotable first end, the pivotable first end being configured to attachably rotate relative to a securing surface of the information handling system chassis;

a latching second end, the latching second end being configured to releasably lock the expansion card retaining apparatus within a chassis opening defined in a card bay assembly surface of the information handling system chassis in a locking position that prevents rotation of the expansion card retaining apparatus about the pivotable first end;

at least one resiliently deformable coupling section extending between the pivotable first end and the latching second end, the coupling section being resiliently deformable and the latching second end being positionable within the chassis opening to maintain the latching second end in the locking position, the coupling section being further resiliently deformable by an external force to remove the bias from the latching second end within the chassis opening and release the latching second end from the locking position; and a retention section extending between the at least one coupling section and the pivotable first end;

wherein the retention section is configured to bias a retaining bracket of a card assembly or card bay cover against a securing surface of the information handling system chassis when the latching second end is in the locking position within the chassis opening to retain the expansion card assembly or card bay cover in installed position within the card bay; and wherein the retention section is configured to rotate away from the securing surface of the information handling system chassis when the latching second end is released from the locking position so that the retaining bracket of the expansion card assembly or card bay cover is removable from the card bay; and wherein the expansion card retaining apparatus further comprises two resiliently deformable coupling sections extending between the pivotable first end and the latching second end; wherein each of the two resiliently deformable coupling sections forms a part of a respective clip segment, the two respective clip segments being adjacently spaced apart from each other; and wherein the latching second end comprises a transverse linking segment that links together the two adjacently-spaced clip segments.

12. The apparatus of claim 11, wherein the pivotable first end comprises a pivot axle extending outwardly from each of the two resiliently deformable coupling sections such that a first pivot axle extends from a first one of the clip segments in a direction opposite from the direction that a second pivot axle extends from a second one of the clip segments, each of the first and second pivot axles being configured to be rotatably received within a respective axle retaining structure provided on the securing surface of the information handling system chassis.

13. The apparatus of claim 12, wherein the adjacently-spaced clip segments are configured to resiliently-deform toward each other to allow insertion of each of the first and second pivot axles into a respective axle retaining structure of the chassis securing surface at the same time, and to expand outwardly to return to their original position with the pivot axles inserted into the axle retaining structures of the chassis securing surface to rotatably attach the pivotable first end of the expansion card retaining apparatus to the securing surface of the information handling system chassis such that the transverse linking segment is positioned on a backside of the card bay assembly surface and the pivotable first end of each of the two respective clip segments is positioned on a frontside of the card bay assembly surface.

14. The apparatus of claim 11, wherein the latching second end comprises a downward-stepping latch section and a step section, the latch section being positioned between the step section and the coupling sections; wherein the coupling sections are configured to hold the latching second end in locking position with the latch section in place opposite a frontside of the card bay assembly surface of the information handling system chassis and with the step section positioned within the opening in the card bay assembly surface such that the retention section is maintained in position to bias the retaining bracket of the expansion card assembly or card bay cover against the securing surface of the information handling system chassis.

15. The apparatus of claim 11, wherein the latching second end comprises a downward-stepping latch section and a step section, the latch section being positioned between the step section and the coupling sections; and wherein:
the coupling sections are configured to resiliently deform to allow the retention section to rotate toward the securing surface of the information handling system chassis to move the latching second end toward the card bay assembly surface of the information handling system chassis; and
each of the coupling sections is further configured to return toward its original shape to hold the latching second end in locking position with the latch section in place opposite a frontside of the card bay assembly surface of the information handling system chassis and the step section positioned within the opening in the card bay assembly surface such that the retention section is maintained in position to bias the retaining bracket of the expansion card assembly or card bay cover against the securing surface of the information handling system chassis.

16. The apparatus of claim 15, wherein the coupling sections are configured to resiliently deform to allow the latch section to move away from position opposite a frontside of the card bay assembly surface of the information handling system chassis to release the latching second end from locking position and allow the retention section to rotate away from the securing surface of the information handling system chassis to move the latching second end away from the card bay assembly surface of the information handling system chassis such that the retaining bracket and corresponding expansion card assembly or card bay cover is removable from the card bay.

17. The method of claim 1, wherein the expansion card retaining apparatus comprises two retention sections, each of the two retention sections extending between a respective one of the two coupling sections and the pivotable first end; wherein the latching second end comprises two downward-stepping latch sections and two step sections, each of the latch sections being positioned between a respective one of the step sections and a respective one of the two coupling sections; and wherein the method further comprises:
positioning the retention sections to bias a retaining bracket of the card assembly or card bay cover against a securing surface of the information handling system chassis while at the same time the latching second end is in a locking position within the chassis opening to retain the expansion card assembly or card bay cover in installed position within the card bay; and
releasably locking the expansion card retaining apparatus within the chassis opening defined in the card bay assembly surface of the information handling system chassis in the locking position to prevent rotation of the expansion card retaining apparatus about the pivotable first end by positioning the latching second end within the chassis opening to maintain the latching second end in the locking position with the bias applied to the retaining bracket of the card assembly or card bay cover.

18. The method of claim 17, further comprising:
resiliently deforming each of the coupling sections and rotating the retention sections toward the securing surface of the information handling system chassis to move the latching second end toward the card bay assembly surface of the information handling system chassis; and
allowing each of the coupling sections to return toward its original shape to hold the latching second end in locking position with the latch sections in place opposite the frontside of the card bay assembly surface of the information handling system chassis and the step sections positioned within the opening in the card bay assembly surface such that the retention sections are maintained in position to bias the retaining bracket of the expansion card assembly or card bay cover against the securing surface of the information handling system chassis.

19. The method of claim 18, further comprising:
resiliently deforming the coupling sections to move the latch sections away from position opposite the frontside of the card bay assembly surface of the information handling system chassis to release the latching second end from locking position;
then rotating the retention sections away from the securing surface of the information handling system chassis to move the latching second end away from the card bay assembly surface of the information handling system chassis; and
then removing the retaining bracket and corresponding expansion card assembly or card bay cover from the card bay.

20. The system of claim 6, wherein the expansion card retaining apparatus comprises:

two retention sections, each of the two retention sections extending between a respective one of the two coupling sections and the pivotable first end;

wherein the latching second end of the expansion card retaining apparatus comprises two downward-stepping latch sections and two step sections, each of the latch sections being positioned between a respective one of the step sections and a respective one of the two coupling sections;

wherein the retention sections are configured to bias a retaining bracket of a card assembly or card bay cover against a securing surface of the information handling system chassis when the latching second end is in the locking position within the chassis opening to retain the expansion card assembly or card bay cover in installed position within the card bay; and wherein the retention sections are configured to rotate away from the securing surface of the information handling system chassis when the latching second end is released from the locking position so that the retaining bracket of the expansion card assembly or card bay cover is removable from the card bay.

21. The system of claim 20, wherein the coupling sections are configured to resiliently deform to allow the retention sections to rotate toward the securing surface of the information handling system chassis to move the latching second end toward the card bay assembly surface of the information handling system chassis; and wherein each of the coupling sections is further configured to return toward its original shape to hold the latching second end in locking position with the latch section in place opposite the frontside of the card bay assembly surface of the information handling system chassis and the step sections positioned within the opening in the card bay assembly surface such that the retention sections are maintained in position to bias the retaining bracket of the expansion card assembly or card bay cover against the securing surface of the information handling system chassis.

22. The system of claim 21, wherein the coupling sections are configured to resiliently deform to allow the latch sections to move away from position opposite the frontside of the card bay assembly surface of the information handling system chassis to release the latching second end from locking position and allow the retention sections to rotate away from the securing surface of the information handling system chassis to move the latching second end away from the card bay assembly surface of the information handling system chassis such that the retaining bracket and corresponding expansion card assembly or card bay cover is removable from the card bay.

23. The apparatus of claim 11, comprising:

two retention sections, each of the two retention sections extending between a respective one of the two coupling sections and the pivotable first end;

wherein the latching second end of the expansion card retaining apparatus comprises two downward-stepping latch sections and two step sections, each of the latch sections being positioned between a respective one of the step sections and a respective one of the two coupling sections;

wherein the coupling sections are configured to hold the latching second end in locking position with the latch section in place opposite a frontside of the card bay assembly surface of the information handling system chassis and with the step sections positioned within the opening in the card bay assembly surface such that the retention sections are maintained in position to bias the retaining bracket of the expansion card assembly or card bay cover against the securing surface of the information handling system chassis.

24. The apparatus of claim 23, wherein the coupling sections are configured to resiliently deform to allow the retention sections to rotate toward the securing surface of the information handling system chassis to move the latching second end toward the card bay assembly surface of the information handling system chassis; and each of the coupling sections is further configured to return toward its original shape to hold the latching second end in locking position with the latch section in place opposite a frontside of the card bay assembly surface of the information handling system chassis and the step sections positioned within the opening in the card bay assembly surface such that the retention sections are maintained in position to bias the retaining bracket of the expansion card assembly or card bay cover against the securing surface of the information handling system chassis.

25. The apparatus of claim 23, wherein the coupling sections are configured to resiliently deform to allow the latch sections to move away from position opposite a frontside of the card bay assembly surface of the information handling system chassis to release the latching second end from locking position and allow the retention sections to rotate away from the securing surface of the information handling system chassis to move the latching second end away from the card bay assembly surface of the information handling system chassis such that the retaining bracket and corresponding expansion card assembly or card bay cover is removable from the card bay.

* * * * *